US012573322B2

(12) United States Patent
Boatwright

(10) Patent No.: US 12,573,322 B2
(45) Date of Patent: Mar. 10, 2026

(54) DISPLAY FRAME ASSEMBLY AND METHOD FOR MANUFACTURING THEREOF

(71) Applicant: Boatwright & Egan Ltd, Houghton (GB)

(72) Inventor: James Boatwright, Houghton (GB)

( * ) Notice: Subject to any disclaimer, the term of this patent is extended or adjusted under 35 U.S.C. 154(b) by 37 days.

(21) Appl. No.: 18/791,657

(22) Filed: Aug. 1, 2024

(65) Prior Publication Data

US 2026/0038396 A1 Feb. 5, 2026

(51) Int. Cl.

*G09F 15/00* (2006.01)
*A47F 5/08* (2006.01)
*A47F 11/10* (2006.01)

(52) U.S. Cl.

CPC ........ *G09F 15/0012* (2013.01); *A47F 5/0838* (2013.01); *A47F 11/10* (2013.01)

(58) Field of Classification Search

CPC ..... G09F 15/0012; A47F 5/0838; A47F 11/10
See application file for complete search history.

(56) References Cited

U.S. PATENT DOCUMENTS 5,136,797 A * 8/1992 Hildebrandt ............ B41F 15/36 101/415.1
5,255,803 A * 10/1993 Pavone ..................... A47F 5/00 248/220.21
5,377,851 A * 1/1995 Asano .................. A47B 57/402 211/192
5,685,099 A * 11/1997 Favata .................. G09F 21/048 40/590
6,015,124 A * 1/2000 Loy ....................... A47F 5/0815 40/607.13
6,782,646 B1 * 8/2004 Devaney ............. G09F 15/0025 40/590
8,376,156 B2 * 2/2013 Jarvis .................. A47B 47/045 211/187

(Continued)

FOREIGN PATENT DOCUMENTS

CN 209883650 U 1/2020
DE 102010001661 A1 8/2011

(Continued)

OTHER PUBLICATIONS

Combined Search and Examination Report under Sections 17 and 18(3) issued for United Kingdom Patent Application GB2416482.4, on Jan. 28, 2025, 07 Pages.

(Continued)

*Primary Examiner* — Ko H Chan
(74) *Attorney, Agent, or Firm* — RC Trademark Company

(57) ABSTRACT

Disclosed is display frame assembly, comprising a plurality of extrusion members wherein each extrusion member is attached to a neighboring extrusion member to form a display frame. The first extrusion member is adapted to hold a Silicon Edge Graphic (SEG) display fabric and a slatwall bracket. The first extrusion member comprises a first profile adapted to accommodate and retain a silicon edge of the corresponding SEG display fabric to hold the corresponding SEG display fabric, The second profile adapted to accommodate and clamp onto a cooperating member of a slatwall bracket to display a plurality of products.

15 Claims, 17 Drawing Sheets

(56) References Cited

U.S. PATENT DOCUMENTS

| | | | | |
|---|---|---|---|---|
| 8,967,402 | B2 * | 3/2015 | Pintur | A47B 47/022 211/DIG. 1 |
| 10,672,302 | B1 * | 6/2020 | Schultz | A47F 5/101 |
| 10,939,756 | B2 * | 3/2021 | Peck | F21V 21/35 |
| 12,059,073 | B1 * | 8/2024 | Justice | A47F 5/0815 |
| 2010/0043268 | A1 * | 2/2010 | Powell | A47G 1/10 40/785 |
| 2024/0105086 | A1 * | 3/2024 | Huenefeld | G09F 15/0018 |

FOREIGN PATENT DOCUMENTS

| | | | |
|---|---|---|---|
| DE | 202016100558 | U1 | 5/2017 |
| KR | 20120102850 | A | 9/2012 |
| WO | 2009103545 | A1 | 8/2009 |

OTHER PUBLICATIONS

Combined Search and Examination Report under Sections 17 and 18(3) issued for United Kingdom Patent Application GB2411371.4, on Jan. 28, 2025, 07 Pages.

* cited by examiner

DISPLAY FRAME ASSEMBLY AND METHOD FOR MANUFACTURING THEREOF

TECHNICAL FIELD

The present disclosure relates to display frame assemblies. Moreover, the present disclosure relates to methods for manufacturing display frame assemblies.

BACKGROUND

Generally, extrusions of various metals and plastics are used globally to house graphics and merchandise products. Silicon Edge Graphics (SEG) are one of the most common methods to manufacturing an extruded framed graphic. A frame extrusion is formed in a way that allows a silicone edge to be inserted into a tight-fitting groove located around a front face of an assembled graphic frame. The graphic display is then subsequently stretched tight by an assembled graphic frame. The frames are available in various sizes and finishes. Therefore, each extrusion member of the graphic frame is typically provided in lengths that can be cut down to the required length, often using mitre cuts, which are joined at the corners of an assembled graphic frame.

The extrusion members of an assembled graphic frame may be manufactured to provide a graphic frame with either a single sided display, or a double-sided display. The extrusion members of an assembled graphic frame may be manufactured to provide either a wall mounted display frame, or a freestanding display frame via one or more supporting feet. An assembled graphic frame may comprise an array of Light Emitting Diodes that allows the assembled frame to function as a lightbox.

Slatwall panel systems are used in various configurations globally, often to merchandise products in a retail environment or event. Each slatwall panels is typically manufactured from timber or metal substrate, which comprises multiple horizontal slats formed into it. The slats may also be finished with additional extruded inserts to provide more strength and make them aesthetically more pleasing, thus hiding the raw timber from the cut. The slats are cut into the panel in a configuration, which enables them to take a wide range of slatwall fixtures, which might include shelves, prongs, graphic frames, clothing rails & custom-made fixtures to merchandise specific products. These known slatwall fixtures are fabricated to slot into the slats, thus allowing the wall to take the weight of the product, supported by the fixture.

There are multiple known solutions for displaying a graphic on a slatwall. One solution is the use of an adhesive material to bond the graphic on to the surface of a slatwall. Another solution is creating a framed graphic that comprises a slatwall compatible clip, which in use is clipped into one of the existing slats.

It is also known for a freestanding graphic display to comprise one or more slatwall fixtures. This configuration requires the manufacture of a stand which houses an SEG frame, and a separate additional section for supporting and/or holding a slatwall fixture. The additional section is typically manufactured from a metal or timber material.

Despite their widespread use, the existing solutions have several limitations. The reliance on multiple, separate components makes the design process complex and manufacturing labour-intensive. This complexity leads to higher manufacturing costs and limits what is commercially achievable with the product configuration options available. Moreover, the overall weight of the display frame is increased, which can be a significant drawback in applications where portability or ease of installation is critical.

Therefore, in light of the foregoing discussion, there exists a need to overcome the aforementioned drawbacks.

SUMMARY

The aim of the present disclosure is to provide a display frame assembly and a method for manufacturing a display frame assembly to create a robust display frame assembly which helps to reduce the number of parts required for simultaneously carrying Silicon Edge Graphic (SEG) display panel and retaining one or more pre-existing slatwall compatible fixtures, such as shelves, arms, prongs, clothing rails or the like. The aim of the present disclosure is achieved by a display frame assembly and a method for manufacturing a display frame assembly as defined in the appended independent claims to which reference is made to. Advantageous features are set out in the appended dependent claims.

Throughout the description and claims of this specification, the words “comprise”, “include”, “have”, and “contain” and variations of these words, for example “comprising” and “comprises”, mean “including but not limited to”, and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
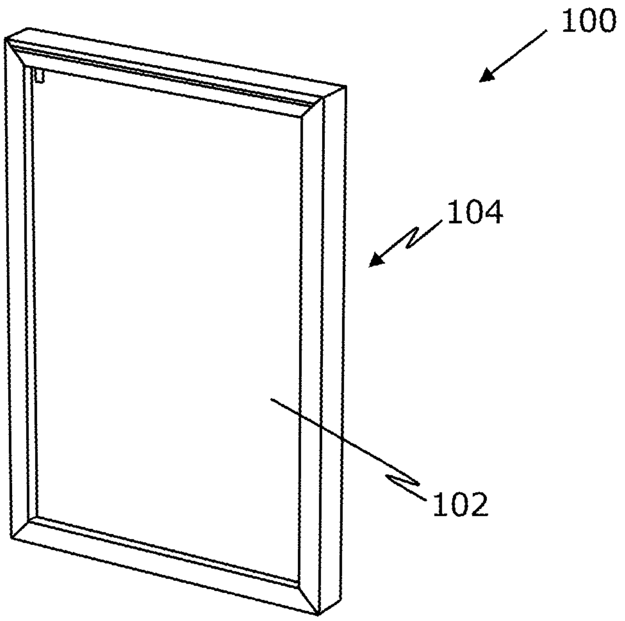
FIGS. 1A and 1B are schematic illustrations of a front view of a display frame assembly and an exploded view of the display frame assembly, respectively, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a display frame assembly, comprising:

- a plurality of extrusion members wherein each extrusion member is attached to a neighboring extrusion member to form a display frame wherein a first extrusion member provides a peripheral edge of a first face of the display frame; the first extrusion member is adapted to hold a Silicon Edge Graphic (SEG) display fabric and a slatwall bracket, and wherein the first extrusion member comprises:
- a first profile adapted to accommodate and retain a silicon edge of the corresponding SEG display fabric to hold the corresponding SEG display fabric, and
- a second profile adapted to accommodate and clamp onto a cooperating member of a slatwall bracket to display a plurality of products.

The present disclosure provides an aforementioned display frame assembly that is able to substantially reduce the number of different extrusion components required for displaying the SEG display fabric and supporting the slatwall brackets, respectively. Moreover, the at least one extrusion member is able to retain the silicon edge of the SEG display fabric whilst simultaneously holding the cooperating member of the slatwall bracket, which makes the display frame assembly cheaper to manufacture, lighter and simpler to build. Furthermore, the first profile and the second profile are able to provide versatile and secure hold for the display fabric and the cooperating member of the slatwall bracket, respectively, which prevents sagging and displacement of the SEG display fabric as well as the slatwall bracket. Furthermore, the display frame is able to provide high-quality visual displays in different settings such as trade shows, retail environments, and promotional events.

In a second aspect, the present disclosure provides a method for manufacturing a display frame assembly, comprising:

- assembling a plurality of extrusion members to form a display frame wherein a first extrusion member provides a peripheral edge of a first face of the display frame; the first extrusion member is adapted to hold a Silicon Edge Graphic (SEG) display fabric and a slatwall bracket on the first face of the display frame, and wherein the first extrusion member comprises:
- a first profile adapted to accommodate and retain a silicon edge of the corresponding SEG display fabric to hold the corresponding SEG display fabric, and
- a second profile adapted to accommodate and clamp onto a cooperating member of a slatwall bracket to display a plurality of products.

The present disclosure provides an aforementioned method that is able to manufacture the display frame assembly that substantially reduces the number of different extrusion components required for displaying the SEG display fabric and supporting the slatwall brackets, respectively. Moreover, the method is able to attach the first extrusion member to a corresponding peripheral edge of a first face of the display frame to ensure that the SEG display fabric securely held along the edge, providing a taut and smooth display surface. Furthermore, method enhances the stability and integrity of the display frame, preventing deformation or sagging. Furthermore, the at least one extrusion member is able to retain the silicon edge of the SEG display fabric whilst simultaneously holding the cooperating member of the slatwall bracket, which makes the display frame assembly cheaper to manufacture, lighter and simpler to build. The use of first profile ensures a secure and tight hold of the silicon edge of the SEG display fabric, so that the SEG display fabric remains smooth and wrinkle-free, enhancing the visual quality of the display. Furthermore, use of the second profile facilitates accommodation of the slatwall bracket that allows the display of multiple products.

Throughout the present disclosure, the term "display frame assembly" refers to a multipurpose structure that is commercially used to display products and advertisements in a single assembly structure. Typically, the display frame assembly is intended to be sturdy, easy to assemble and versatile for different commercial applications.

Throughout the present disclosure, the term "display board" refers to a rigid or non-rigid element that is designed to showcase graphics, advertisements, promotional content and the like. Notably, the assembled display frame is able to provide a professional appearance of a display board, which is crucial for high-quality visual displays in different settings such as trade shows, retail environments, promotional events and the like. The term "Silicon Edge Graphic (SEG) display fabric" refers to a display fabric over which the content that is to be displayed on the display frame is printed in high definition quality. Typically, the SEG display fabric is characterized by a silicon beading sewn around the edges thereof. Beneficially, the silicon edges in the SEG display fabric enables the SEG display fabric to be easily inserted into the display frame, creating a smooth and seamless visual representation on the display frame. The term "face" refers to a surface of the display frame that is visible to customers to display the SEG display fabric. It will be appreciated that "at least one face" refers to "a single face" in some implementations, and "a plurality of faces" in other implementations. Throughout the present disclosure, the term "corresponding SEG display fabric" refers to a separate SEG display fabric that is displayed on each face of the display frame. Notably, each face of the display frame being adapted to provide the support to the corresponding SEG display fabric implies that each face of the display frame securely holds the corresponding SEG fabric to keep the corresponding SEG fabric taut and smooth for optimal visual presentation.

Optionally, the corresponding SEG display fabric is made using one of: a high-resolution fabric, a polyester. Herein, the term "high-resolution fabric" refers to a type of fabric that is specifically engineered for displaying detailed, high-quality and sharp content with exceptional clarity. Typically, the high-resolution fabric supports high-quality print resolutions, allowing for reproduction of vibrant colors, fine details and intricate designs. Notably, the high-resolution fabric is made from tightly woven fibers that can withhold detailed prints without blurring or pixelation. Throughout the present disclosure, the term "polyester" refers to a synthetic fabric material that is used to make the corresponding SEG display fabric. Typically, the polyester is resistant to stretching, shrinking and abrasion. Notably, the polyester provides a smooth surface that supports high-resolution printing and ensures vibrant colors and sharp details in the printed graphics. Moreover, the polyester is suitable for use in both indoor and outdoor environments due to durability and ease of maintenance of the polyester. It will be appreciated that the corresponding SEG display fabric can be made from either the high-resolution fabric or the polyester. A technical effect is that the corresponding SEG display fabric can be used repeatedly without losing appearance and visual aesthetics because the high-resolution fabric offers exceptional visual clarity while the polyester provides strength.

Throughout the present invention, the term "extrusion member" refers to an equipment that extrudes out of a surface to hold and support the SEG display fabric and the slatwall bracket in the display frame assembly, simultaneously. Typically, the at least one extrusion member provide a strong and rigid framework for maintaining the stability and durability of the display frame assembly. Optionally, the at least one extrusion member is made using one of: aluminium, steel. Notably, aluminium has a high strength-to-weight ratio, providing structural support to the at least one extrusion member without adding unnecessary bulk. Moreover, aluminium is easy to extrude into complex shapes, allowing for precise manufacturing of the at least one extrusion member. Herein, steel is a strong, durable metal alloy that is used to make the first extrusion member. Notably, steel due to its robustness and high tensile strength, suitable for heavy-duty applications such as the display frame that need to support heavier objects. Furthermore, the one of: aluminium, steel reduces the manufacturing cost and suitability in high-strength applications for the at least one extrusion member. A technical effect is that the at least one extrusion member is able to support heavier loads and withstand more wear and tear due to excellent corrosion resistance property, thus increase lifespan of the display frame assembly.

Throughout the present disclosure, the term "peripheral edge" refers to an outer boundary or border that surrounds a face of the display frame. Typically, the peripheral edges define outermost boundaries of a face of display frame. Herein, the "corresponding peripheral edge" refers to that peripheral edge to which a given extrusion member amongst the at least one extrusion member is attached. Notably, depending on the shape of the display frame (for example rectangular, square and the like) the at least one corresponding peripheral edge follows contour of the at least one face thereof. Advantageously, the first extrusion member attached to the at first corresponding peripheral edge, provides a clean and finished look to the display frame. Moreover, the first extrusion member is attached to the at least one corresponding peripheral edge using an attachment means such as screw, bolts, fasteners, and the like.

Optionally, each extrusion member further comprises a channel arranged in a central part of each extrusion member, wherein the channel is adapted to retain a planar supporting member. In this regard, the term "channel" refers to a hollow and linear cavity within the at least one extrusion member. The term "light emitting diode" refers to a semiconductor device that emits light when an electric current passes therethrough. Typically, the Light Emitting Diode (LED) is made from semiconductor materials such as gallium arsenide (GaAs), gallium phosphide (GaP) and the like. Moreover, the LEDs are used to provide backlighting or edge lighting for the display frame. The term "central part" refers to a region within the at least one extrusion member that is equidistant from outer edges of the at least one extrusion member. Moreover, the channel arranged in the central part of each extrusion member accommodates and securely holds a planar board. The planar board supports an array of LED components across the planar member. A technical effect of positioning the LED in the channel is that the light is distributed uniformly across the face of the display frame, eliminating dark spots and shadows, and better lighting enhances the visibility of the display, making the display frame assembly more attractive and effective for showcasing the plurality of products.

Optionally, the planar supporting member comprises a first face pointing towards a first direction and a second face pointing towards a second direction opposite to the first direction, and wherein the first extrusion member comprises a first extrusion component arranged on a corresponding peripheral edge of the first face and a second extrusion component arranged on a corresponding peripheral edge of the second face, such that the central part of the first extrusion component is in contact with the central part of the second extrusion component to form a merged channel adapted to hold the rigid planar member.

In this regard, the term “first face” refers to one of the surfaces of the display frame that is used to present information or graphics. The term “second face” refers to that surface of the display frame facing opposite to the first face. Typically, the second surface is used to present graphics or display information. The term “first direction” refers to that direction towards which the first face of the display frame is pointed. Similarly, the term “second direction” refers to that direction towards which the second face of the display frame is pointed. The term “first extrusion member” refers to an extrusion member that is attached to a corresponding peripheral edge of the first face of the display frame. The term “second extrusion member” refers to the extrusion member that is attached to a corresponding peripheral edge of the second face of the display frame. Moreover, the display frame assembly consists of a dual-face display frame that is able to present the information or graphics on both sides of the display frame, increasing visibility and utility. Furthermore, the first face and the second face of the display frame points in opposite directions, with the first and the second extrusion member attached to the peripheral edges of the first face and the second face, respectively. The central parts of the first and the second extrusion member, respectively, come into contact to form a single, merged channel that holds the LED. Advantageously, combining the central parts of the extrusion members into a merged channel provides a more efficient use of space and materials of the at least one extrusion member. A technical effect is that the display frame can be viewed from both directions, making the display frame suitable for environments where visibility from multiple angles is crucial, such as in advertising and retail settings. Additionally, use of the single, merged channel for the LED reduces the need for additional materials and components, making the display frame more cost-effective to produce.

Throughout the present disclosure, the term “first profile” refers to a section of the at least one extrusion member that is designed to accommodate and securely retain the silicon edge of the corresponding SEG display fabric. Typically, the first profile provides a secure retaining mechanism that tightly holds onto the silicon edge of the corresponding SEG display fabric to maintain tension and prevent sagging in the corresponding SEG display fabric over time. The term “silicon edge” refers to a thin strip or band made up of silicone material that is sewn or attached along an edge of the corresponding SEG display fabric. Notably, the primary function of the silicon edge is to provide a flexible yet durable edge that can be inserted into the first profile of the at least one extrusion member. Once inserted, the first profile of the at least one extrusion member holds onto the silicon edge and creates tension in the corresponding SEG display fabric. Advantageously, the first profile facilitates easy installation of the corresponding SEG display fabric and reduces downtime for maintenance of display content in the corresponding SEG display fabric. Furthermore, the first profile may utilize pressure, locking mechanism and the like to hold the silicon edge, ensuring a firm hold without damaging the corresponding SEG display fabric.

Optionally, a first face of the rigid planar member comprises an array of Light Emitting Diode components (LED’s).

In this regard, the rigid planar supports and maintains an array of LED components along a plane which extends through the central channel arranged within each extrusion of the display frame. The LED array comprises LED components that are evenly distributed along the plane extending through the central channel arranged within each extrusion of the display frame.

Optionally, the first profile comprises a groove adapted to accommodate and retain the silicon edge of the corresponding SEG display fabric. In this regard, the term “groove” refers to a long, narrow cut or a depression in the first profile of the at least one extrusion member. It will be appreciated that the groove in the first profile is specifically shaped to accommodate and hold the silicon edge of the corresponding SEG display fabric. Notably, the groove within the first profile is precisely engineered to match the profile of the silicon edge, ensuring a tight fit. A technical effect is that the groove provides a secure attachment point for the silicon edge and ensures that the corresponding SEG display fabric remains taut and does not sag or shift over time. Additionally, the groove allows for straightforward insertion and securing of the silicon edge of the corresponding SEG display fabric.

Optionally, the groove in the first profile comprises a plurality of raised edges. Herein, the term “raised edges” refers to small, raised projections or notches within the groove of the first profile. Typically, the plurality of raised edges are arranged in a pattern along the inner surface of the groove. Moreover, the plurality of raised edges is designed to interlock with the silicon edge of the corresponding SEG display fabric, providing additional grip. Furthermore, the plurality of raised edges is made from the same material as the at least one extrusion member for strength and durability. Furthermore, when the silicon edge of the corresponding SEG display fabric is inserted into the groove, the plurality of raised edges bites into the silicon edge and creates multiple points of contact with the silicon edge and enhances holding force. A technical effect is that the plurality of raised edges distributes the holding force across multiple points evenly, and reducing wear and tear on the silicon edge of the corresponding SEG display fabric.

Optionally, a depth of each raised edge amongst the plurality of raised edges is in a range of 0.5 mm to 2 mm. in this regard, the term “depth” refers to a linear measurement of vertical distance from base of the raised edge (raised edge meets the surface of the groove) to peak or tip of the raised edge. Herein, the depth of each raised edge is in the range of 0.5 mm to 2 mm. Optionally, the depth of each raised edge amongst the plurality of raised edges may be in the range of 0.5, 0.6, 0.7, 0.8, 0.9, 1, 1.2, 1.4, 1.6 or 1.8 mm up to 0.6, 0.7, 0.8, 0.9, 1, 1.2, 1.4, 1.6, 1.8 or 2 mm. Notably, the depth of each raised edge within the groove being in the aforementioned range ensures effective holding of the silicon edge of the corresponding SEG display fabric in the first profile. A technical effect is that the depth range of each raised edge provides a firm and reliable grip on the silicon edge and accommodates slight variations in the thickness of the silicon edge of the corresponding display fabric.

Optionally, a width of each raised edge amongst the plurality of raised edges is in range of 0.1 mm to 0.5 mm. In this regard, the term “width” refers to a linear measurement that indicates horizontal distance across the base of each raised edge amongst the plurality of raised edges. Herein, the width of each raised edge amongst the plurality of raised edges is in the range of 0.1 mm to 0.5 mm. Optionally, the width of each raised edge amongst the plurality of raised edges may be in the range of 0.1, 0.2, 0.3 or 0.4 mm up to 0.2, 0.3, 0.4 or 0.5 mm. Optionally, the width of each raised edge amongst the plurality of raised edges is consistent throughout the groove to provide uniform gripping strength. A technical effect is that the range of the width of each raised edges ensures sufficient surface contact to secure the silicon edge and distributes holding pressure evenly across the silicon edge of the corresponding SEG display fabric within the groove.

Optionally, the groove in the first profile comprises a friction-fit mechanism to retain the silicon edge of the corresponding SEG display panel. In this regard, the term "friction-fit mechanism" refers to a mechanism by which the plurality of raised edges within the groove hold the silicon edge of the corresponding SEG display fabric. Notably, the friction-fit mechanism relies on resistance generated by the friction between surfaces of the groove and the silicon edge of the corresponding SEG display fabric. Moreover, the inner surface of the grove has specific textures to increase the friction. Furthermore, the groove is designed with dimensions that slightly compress the silicon edge upon insertion. Subsequently, as the silicon edge of the corresponding SEG display fabric is pushed into the groove, the friction-fit mechanism engages and creates a firm grip through the friction. A technical effect is that the friction-fit mechanism ensures that the corresponding SEG display fabric remains in place even under varying environmental conditions without the need for additional fastening hardware.

Optionally, the first profile further comprises a raised surface portion within the groove of the first profile, wherein the raised surface portion is adapted to increase a hold of the groove over the silicon edge of the corresponding SEG display fabric. In this regard, the term "raised surface portion" refers to an elevated portion within the groove that is designed to enhance the grip on the silicon edge of the corresponding SEG display fabric. Notably, the raised surface portion is designed to increase contact area and friction between the groove and the silicon edge of the corresponding SEG display frame. Moreover, the raised surface portion holds the silicon edge of the corresponding SEG display frame more securely by creating additional points of contact and increasing the overall grip. A technical effect is that the raised surface portion increases the hold and reduces the probability of slippage of the silicon edge of the corresponding SEG display fabric out of the groove.

Throughout the present disclosure, the term "second profile" refers to section of the at least one extrusion member that is designed to accommodate and securely clamp onto a cooperating member of the slatwall bracket. Typically, the second profile provides a firm grip on the cooperating member of the slatwall bracket and prevents the slatwall bracket from detaching or shifting. Moreover, the design of the second profile of the at least one extrusion member allows to bear weight of multiple products mounted on the slatwall bracket without comprising the stability.

In an implementation, the first profile is arranged to be at a lower position than the second profile in the at least one extrusion member. In another implementation, the first profile is arranged to be at a higher position than the second profile in the at least one extrusion member.

Optionally, the second profile comprises a slot configured to accommodate and retain a cooperating member of the slatwall bracket. In this regard, the term "slot" refers to a specially designed opening within the second profile of the at least one extrusion member to accommodate and clamp onto the cooperating member of the slatwall bracket. Notably, the slot is precisely cut or molded into the second profile of the extrusion member. Moreover, the slot is shaped and dimensioned to fit the cooperating member of the slatwall bracket. Furthermore, the design of the slot allows it to clamp onto the cooperating member, holding the cooperating member securely in place. The clamping may involve friction fit, mechanical locking mechanisms and the like clamping methods. A technical effect is that the slot within the second profile simplifies the process of attaching the slatwall brackets and provides a firm and stable connection point for the slatwall bracket, preventing accidental detachment of the slatwall bracket from the at least one extrusion member.

The term "slatwall bracket" refers to a support bracket that is used to hold and display the plurality of products. The term "products" refers to items or merchandise that are intended to be displayed on the slatwall bracket. Typically, the plurality of products may include wide range of items such as clothing, accessories, electronics, tools, sports equipment, decorative items and the like that are meant to be showcased or sold. Notably, the slatwall bracket is designed to be easily attached as well as detached from the second profile of the at least one extrusion member. Moreover, the slatwall bracket is made from durable materials such as metal or high-strength plastic. Furthermore, the slatwall bracket can be easily moved and reconfigured for flexible display arrangements. Throughout the present disclosure, the term "cooperating member" refers to a part of the slatwall bracket that is designed to fit within the slot of the second profile of the at least one extrusion member. Notably, the cooperating member is designed to match the shape and dimensions of the second profile of the at least one extrusion member.

Optionally, each of the at least one extrusion member further comprises an internal bracket, wherein the internal bracket is adapted to hold a first end of an L-shaped supporting plate, wherein a second end of the L-shaped supporting plate is held by an adjacent extrusion member attached to another peripheral edge adjacent to the corresponding peripheral edge. In this regard, the term "internal bracket" refers to a space present in each of the at least one extrusion member that is configured to hold and secure a first end of the L-shaped supporting plate. Typically, the internal bracket is integral to each of the at least one extrusion member's structure. It will be appreciated that internal bracket is either built into each of the at least one extrusion member during manufacturing or securely attached within each of the at least one extrusion member. Moreover, the internal bracket includes features (such as slots, clips, or other fastening mechanisms) that allows the internal bracket to securely hold the first end of the L-shaped supporting plate. The term "L-shaped supporting plate" refers to a supporting plate shaped like letter 'L' that is used to provide support between the corresponding peripheral edge of the at least one extrusion member and the adjacent extrusion member attached to the another peripheral edge situated adjacent to the corresponding peripheral edge. The term "adjacent extrusion member" refers to an extrusion member that is attached on the adjacent side of the corresponding peripheral edge of the at least one extrusion member. Notably, the second end of the L-shaped supporting plate is held by the adjacent extrusion member to provide lateral support. Moreover, the L-shaped supporting plate has holes to screw the first end and the second end of the L-shaped supporting plate into the internal bracket of the at least one extrusion member and the adjacent extrusion member, respectively. A technical effect is that the internal bracket utilizes the internal space of each extrusion member efficiently to provide support to the display frame without adding external bulk and the display frame gains additional stability, reducing the risk of deformation or collapse under weight or stress.

Optionally, the display frame assembly further comprises a support structure, wherein the support structure is one of: a foot support, a wall support. In this regard, the term "support structure" refers to an auxiliary component that provides stability and support to the display frame assembly. Typically, the support structure ensures that the display frame assembly is securely positioned and maintained in a desired orientation. The term "foot support" refers to a base plate that supports the display frame assembly being placed on ground to make the display frame assembly freestanding. Notably, size of the foot support depends upon the size of the display frame. Optionally, the foot support can be made from the same material that is used to make the at least one extrusion member or from a different material. The term "wall support" refers to a mounting mechanism that attaches the display frame assembly to a wall. Moreover, the support structure ensures that the display frame assembly remains upright and stable in the intended position and prevents the display frame assembly from toppling or shifting. Additionally, the support structure allows the display frame assembly to be used in various environments and configurations, whether freestanding or wall mounted. Furthermore, the support structure includes mechanisms (such as screws, brackets, clamps and the like) that securely attach the supporting structure to the display frame assembly and the supporting surface (floor or the wall). A technical effect is that the foot support provides the display frame a firm base to stand upright, and the wall support ensure that the display frame can be used in a variety of settings and configurations, increasing utility of the empty wall spaces.

Optionally, the display frame is attached to a second SEG display frame, wherein the second SEG display frame is attached to an outer side of an extrusion member, attached to a corresponding top peripheral edge of the display frame.

In this regard, the term "another SEG display board" refers to a second SEG display frame that is attached to the display frame to extend the display surface. Notably, the second display frame is used to display additional information about the plurality of products (such as logo of a brand from which the product belongs). The term "outer side" refers to the external surface of an extrusion member which is one of a plurality of extrusion members which when assembled forms the display frame, is oriented away from the display frame. Moreover, the outer side of the extrusion member is used as a mounting point for attaching the second SEG display frame. Herein, the extrusion member is attached to the corresponding top peripheral edge of the display frame. Furthermore, the attachment ensures that the second SEG display frame align properly and extends the display area in a coordinated manner. A technical effect is to allow for the easy addition of multiple SEG display frames, expanding the display area and allowing for larger and more complex visual presentations.

Optionally, a first extrusion member for use in the previous frame assembly comprising:

- a first profile adapted to accommodate and retain a silicon edge of the corresponding SEG display fabric to hold the corresponding SEG display fabric, and
- a second profile adapted to accommodate and clamp onto a cooperating member of a slatwall bracket to display a plurality of products.

In this regard, the first extrusion member is provided as an independent component for subsequent use to as a component of the frame assembly. E.g. a spare frame component which enables either the repair of the frame assembly or provides a frame component within a kit of parts, whereby the parts can be subsequently assembled to form the frame assembly.

The present disclosure also relates to the method as described above. Various embodiments and variants disclosed above, with respect to the aforementioned display frame assembly, apply mutatis mutandis to the method.

DETAILED DESCRIPTION OF THE DRAWINGS

Figure 1B:
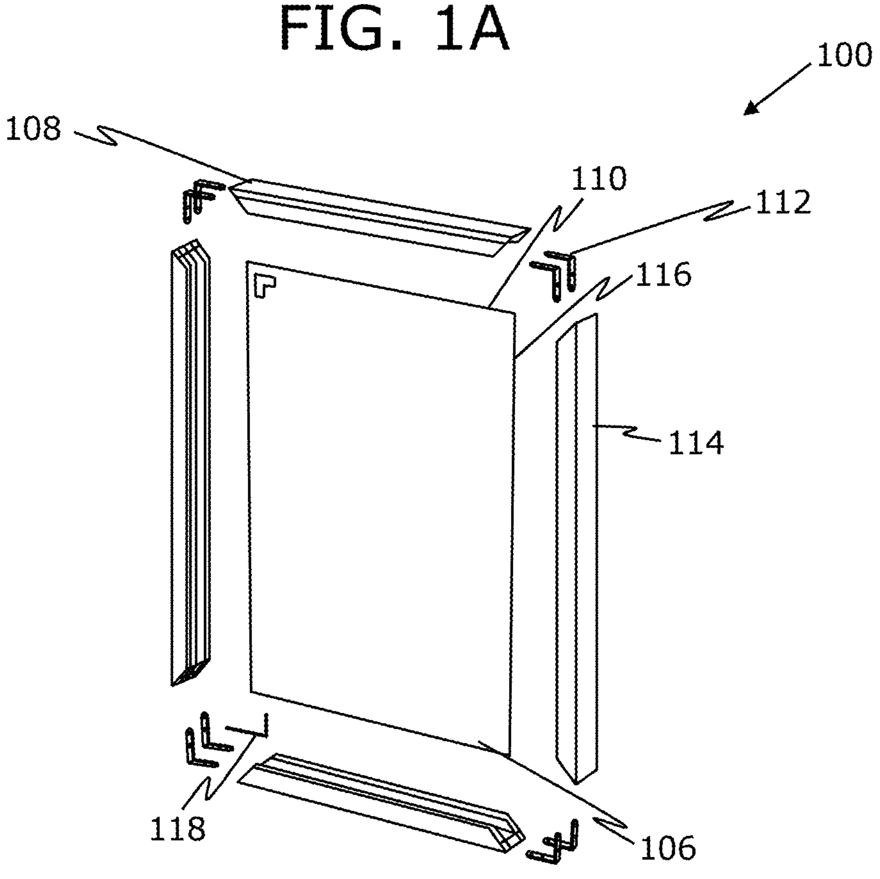

Referring to FIGS. 1A and 1B, illustrated are schematic illustrations of a front view of a display frame assembly 100 and an exploded view of the display frame assembly 100, respectively, in accordance with an embodiment of the present disclosure. As shown, the display frame assembly 100 comprises a support board 102. Moreover, the board 102 is adapted to provide a support to the frame assembly 100. Furthermore, the display frame assembly 100 comprises a first extrusion member (depicted as a first extrusion member 108 attached to at least one corresponding peripheral edge (depicted as a first corresponding peripheral edge 110) of a first face 104 of the support board 102, wherein the first extrusion member 108 is adapted to hold the corresponding SEG display fabric 106, and wherein the first extrusion member 108 comprises a first profile (not shown) adapted to accommodate and retain a silicon edge of a corresponding SEG display fabric 106 to hold the corresponding SEG display fabric 106 (not shown), and a second profile 118 adapted to accommodate and clamp onto a cooperating member of a slatwall bracket (not shown) to display a plurality of products. Optionally, the first extrusion member 108 further comprises an internal bracket (not shown), wherein the internal bracket is adapted to hold a first end of an L-shaped supporting plate 112, wherein a second end of the L-shaped supporting plate 112 is held by an adjacent second extrusion member 114 attached to a second peripheral edge 116 adjacent to the corresponding peripheral edge 110.

Figure 2A:
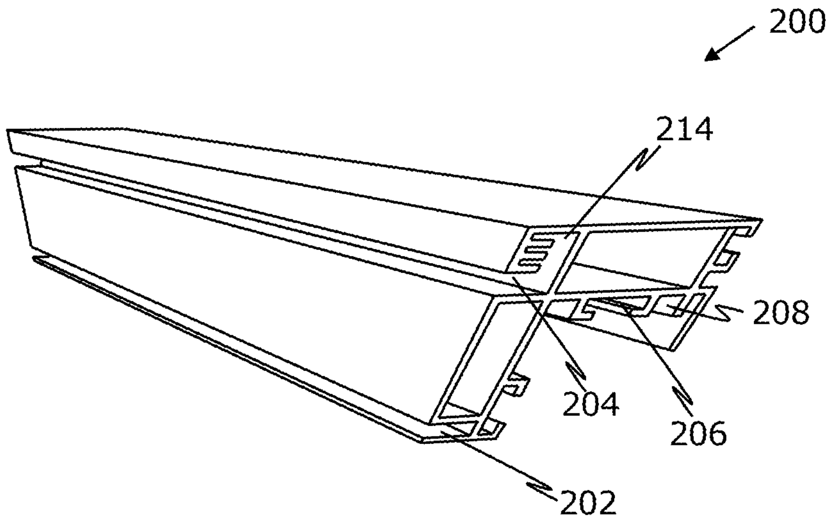
FIGS. 2A, 2B and 2C are schematic illustrations of a perspective view, a cross-sectional view and a front view of at least one extrusion member, respectively, in accordance with an embodiment of the present disclosure.
Figure 2B:
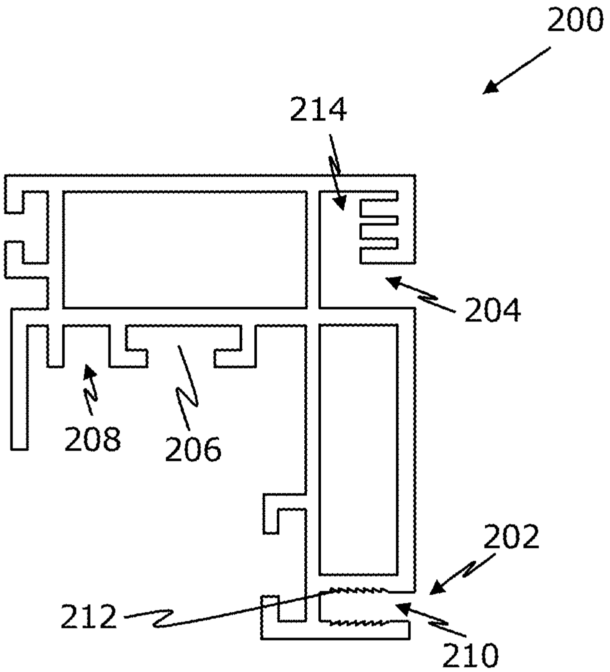
Figure 2C:
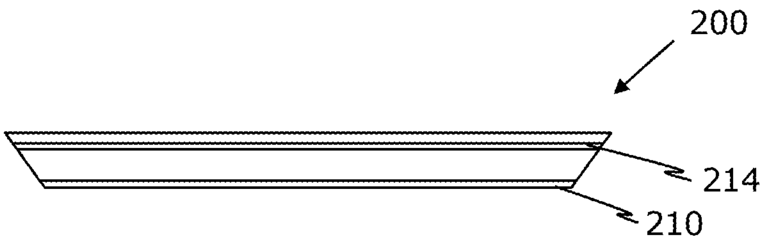

Referring to FIGS. 2A, 2B and 2C, illustrated are schematic illustrations of a perspective view, a cross-sectional view and a front view of first extrusion member 200, respectively, in accordance with an embodiment of the present disclosure. As shown, the at least one extrusion member 200 comprises a first profile 202 adapted to accommodate and retain a silicon edge of a corresponding SEG display fabric to hold the corresponding SEG display fabric, and a second profile 204 adapted to accommodate and clamp onto a cooperating member of a slatwall bracket (not shown) to display a plurality of products. Optionally, the first extrusion member 200 further comprises an internal channel bracket 206, which is adapted to accept an L-shaped supporting bracket corner bracket (not shown). Optionally, the at least one extrusion member 200 further comprises a channel 208 arranged in a central part of the at least one extrusion member 200, wherein the channel 208 is adapted to hold a board for supporting an array of Light Emitting Diodes (LED's) (not shown). Optionally, the first profile 202 of the first extrusion member 200 comprises a groove 210 to accommodate and retain the silicon edge of the corresponding SEG display fabric. Optionally, the first profile 202 further comprises a raised surface portion 212 within the groove 210 of the first profile 202. Optionally, the second profile 204 comprises a slot 214 configured to accommodate and clamp onto the cooperating member of the slatwall bracket. Optionally, the first profile 202 is arranged to be at a lower position than the second profile 204 in the at least one extrusion member 200.

Figure 3A:
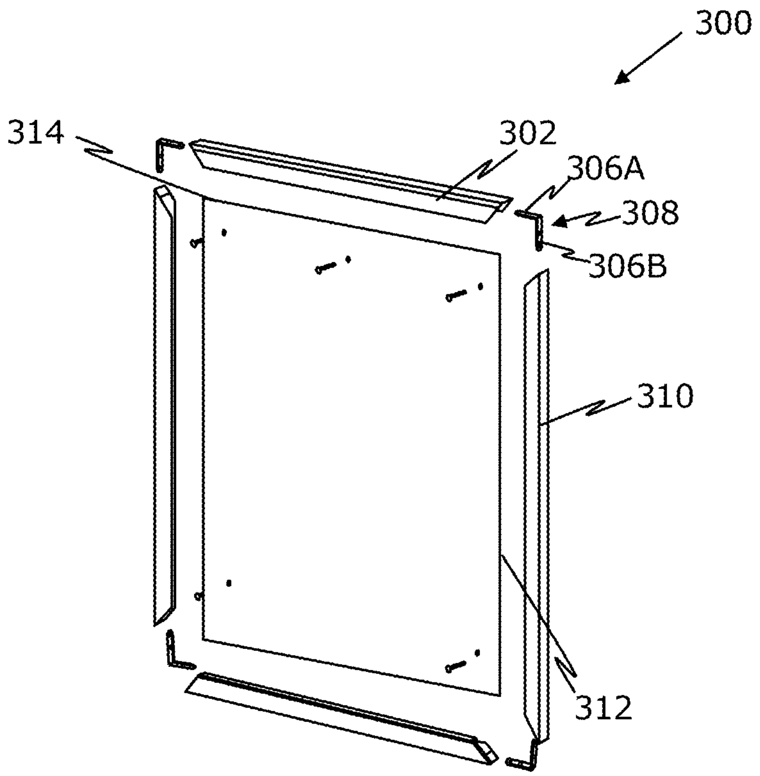
FIGS. 3A and 3B are schematic illustrations of an exploded view of a display frame assembly and a cross-sectional view of the at least one extrusion member, respectively, in accordance with an embodiment of the present disclosure.
Figure 3B:
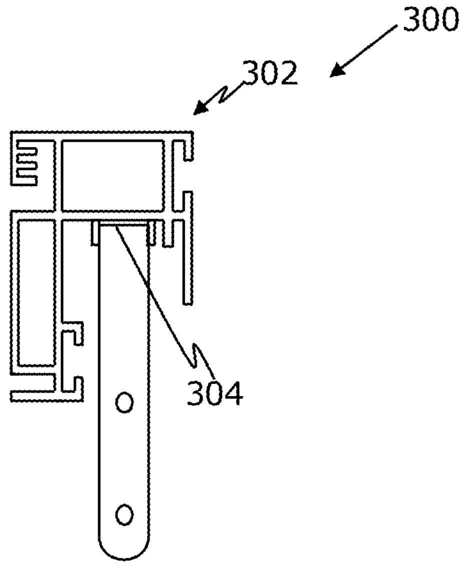

Referring to FIGS. 3A and 3B, illustrated are schematic illustrations of an exploded view of a display frame assembly 300 and a cross-sectional view of a first extrusion member 302, respectively, in accordance with an embodiment of the present disclosure. As shown, the first extrusion member 302 comprises an internal bracket 304. Moreover, the internal bracket 304 is adapted to hold a first end 306A of an L-shaped supporting plate 308 and a second end 306B of the L-shaped supporting plate 308 is held by a second extrusion member 310 attached to a second peripheral edge 312 adjacent to a first corresponding peripheral edge 314.

Figure 4A:
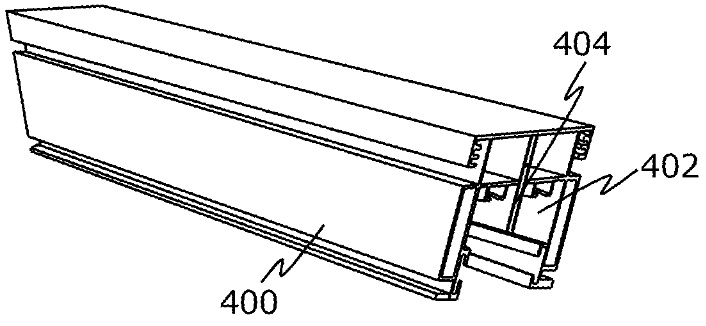
FIGS. 4A, 4B and 4C are schematic illustrations of a perspective view, a cross-sectional view and a front view of an arrangement of a first extrusion member and a second extrusion member, respectively, in accordance with another embodiment of the present disclosure.
Figure 4B:
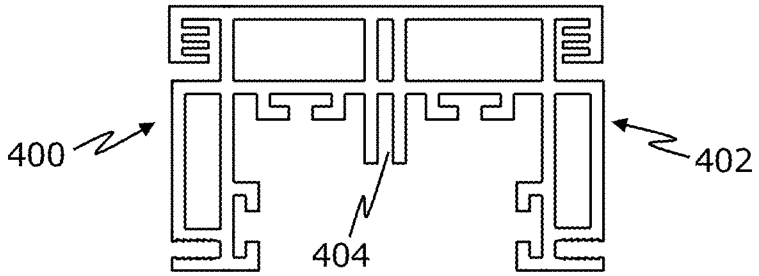
Figure 4C:
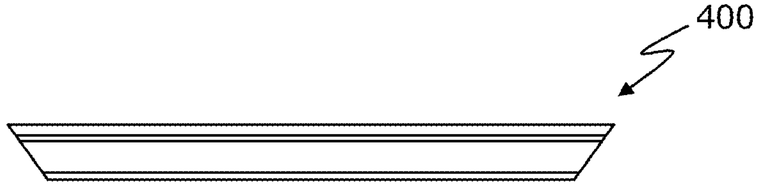

Referring to FIGS. 4A, 4B and 4C, illustrated are schematic illustrations of a perspective view, a cross-sectional view and a front view of an arrangement of a first extrusion component 400 and a second extrusion component 402, respectively, in accordance with another embodiment of the present disclosure. As shown, a central part of the first extrusion component 400 is in contact with a central part of the second extrusion component 402 to form a merged channel 404 adapted to hold a board for supporting an array of LED components (not shown).

Figure 5A:
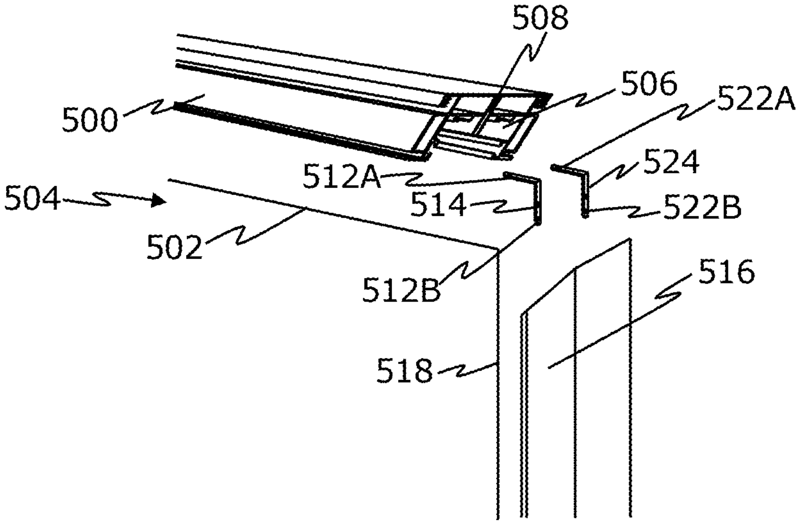
FIGS. 5A, 5B and 5C are schematic illustrations of a perspective view, a front view and a cross-sectional view of a first extrusion member arranged on a corresponding peripheral edge of a first face and a second extrusion member arranged on a corresponding peripheral edge of the second face in a display frame assembly, in accordance with another embodiment of the present disclosure.
Figure 5B:
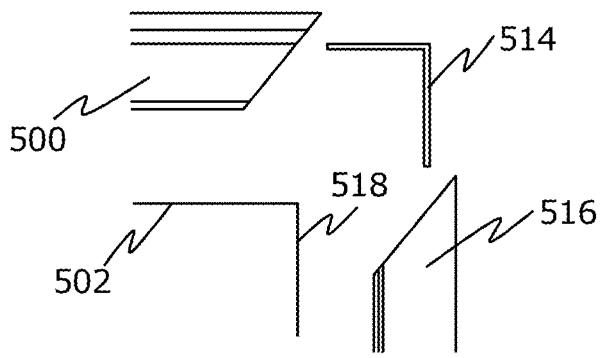
Figure 5C:
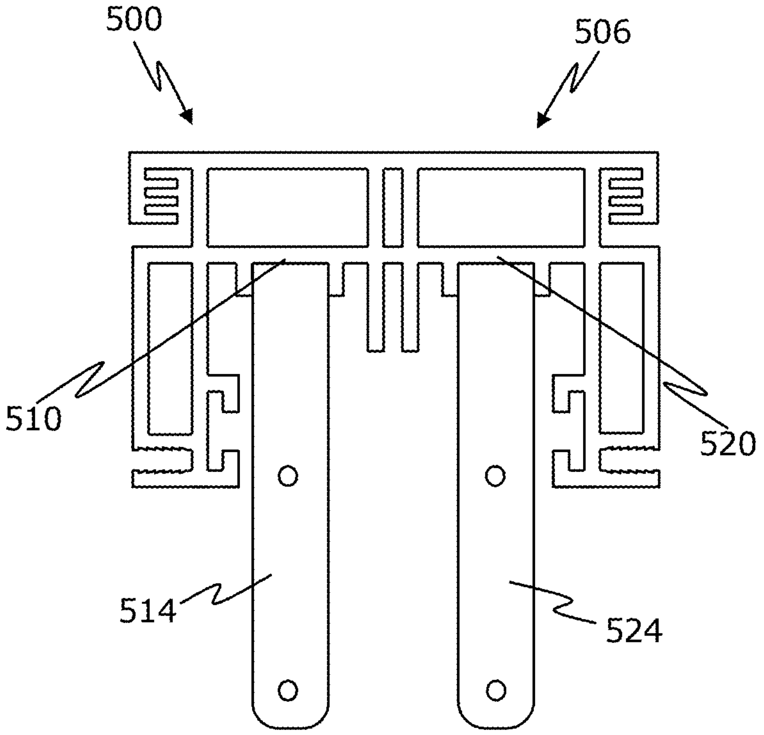

Referring to FIGS. 5A, 5B and 5C, illustrated are schematic illustrations of a perspective view, a front view and a cross-sectional view of a first extrusion component 500 arranged on a corresponding peripheral edge 502 of a first face 504 and a second extrusion component 506 arranged on a second corresponding peripheral edge (not shown) of the second face (not shown) in a display frame assembly (not shown), in accordance with another embodiment of the present disclosure. As shown, a central part of the first extrusion component 500 is in contact with a central part of the second extrusion component 506 to form a merged channel 508 adapted to hold a support board for supporting an array of LED components. Optionally, the first extrusion component 500 comprises a first internal bracket 510 adapted to hold a first end 512A of a first L-shaped supporting plate 514 and a second end 512B of the first L-shaped supporting plate 514 is held by a second adjacent extrusion member 516 attached to a second peripheral edge 518 adjacent to the corresponding first peripheral edge 502. Optionally, the second extrusion member 506 comprises a second internal bracket 520 adapted to hold a first end 522A of a second L-shaped supporting plate 524 and a second end 522B of the second L-shaped supporting plate 514 is held by a second adjacent extrusion member (not shown) attached to another peripheral edge (not shown) adjacent to the corresponding peripheral edge (not shown).

Figure 6:
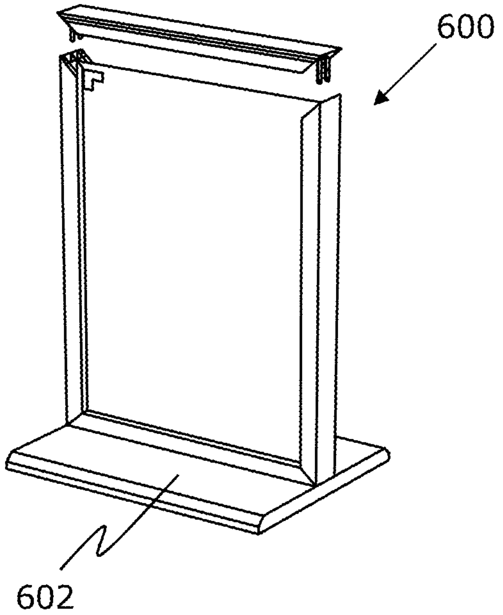
FIG. 6 is a schematic illustration of an exploded perspective view of an implementation of a display frame assembly, in accordance with the embodiment of the present disclosure.

Referring to FIG. 6, illustrated is a schematic illustration of an exploded perspective view of an implementation of a display frame assembly 600, in accordance with the embodiment of the present disclosure. As shown, the display frame assembly 600 comprises a support structure 602, wherein the support structure 602 is a foot support.

Figure 7:
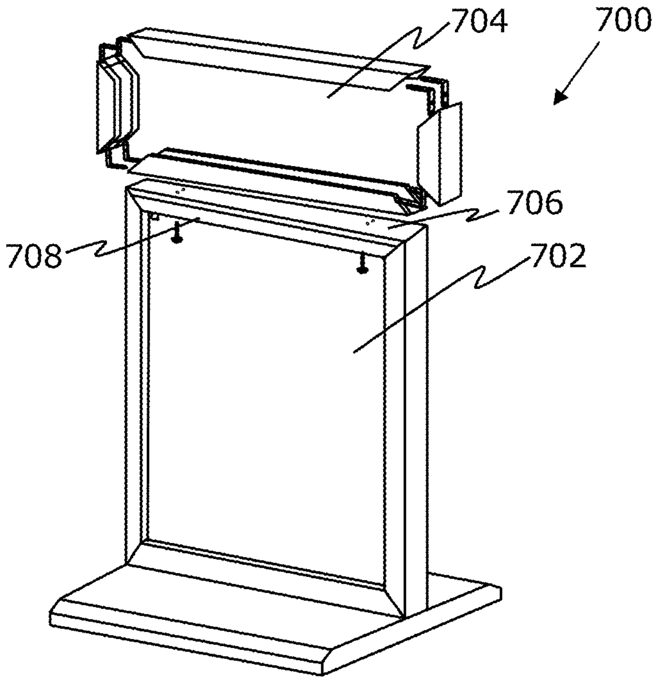
FIG. 7 is a schematic illustration of a perspective view of an implementation of a display frame assembly, in accordance with the embodiment of the present disclosure

Referring to FIG. 7, illustrated is a schematic illustration of a perspective view of an implementation of a display frame assembly 700, in accordance with the embodiment of the present disclosure. As shown, a board 702 of the display frame assembly 700 is attached to a second display frame 704, wherein the second SEG display frame 704 is attached to an outer side 706 of an extrusion member 708 amongst the at least one extrusion member, attached to a corresponding top peripheral edge (not shown) of the display frame 702.

Figure 8:
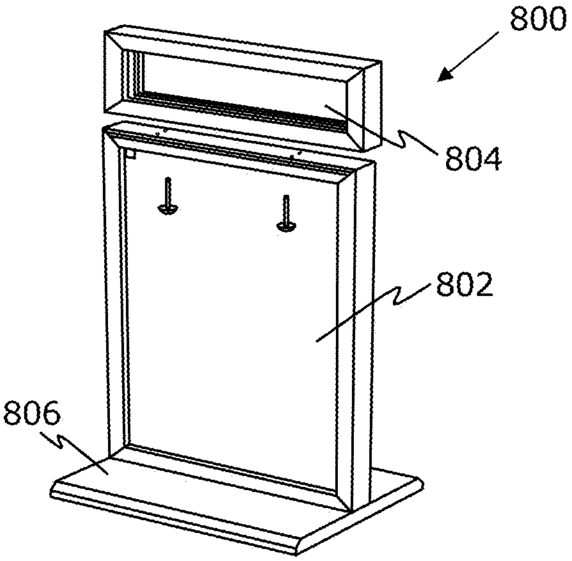
FIG. 8 is a schematic illustration of an exploded perspective view of an implementation of a display frame assembly, in accordance with the embodiment of the present disclosure.

Referring to FIG. 8, illustrated is a schematic illustration of a perspective view of an implementation of a display frame assembly 800, in accordance with the embodiment of the present disclosure. As shown, a supporting board 802 of the display frame assembly 800 is attached to another SEG display frame 804. Moreover, the display frame assembly 800 comprises a support structure 806, wherein the support structure 806 is a foot support.

Figure 9:
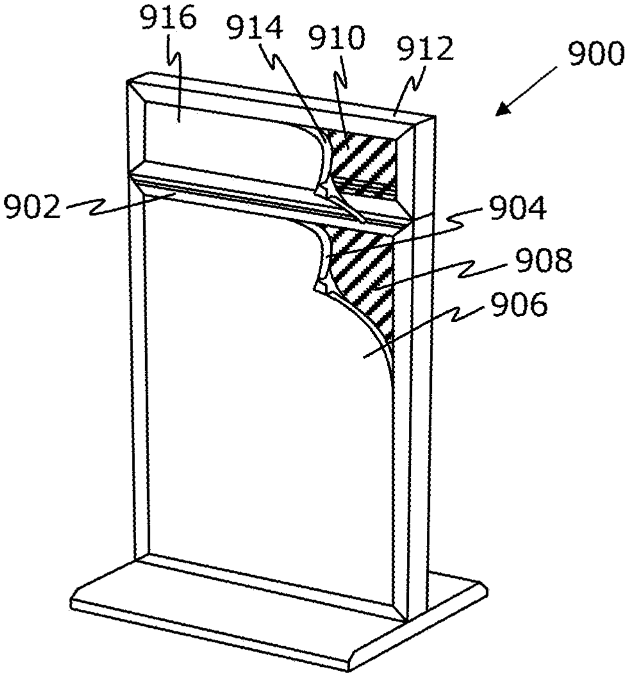
FIG. 9 is a schematic illustration of a perspective view of an implementation of a display frame assembly, in accordance with the embodiment of the present disclosure.
Figure 10A:
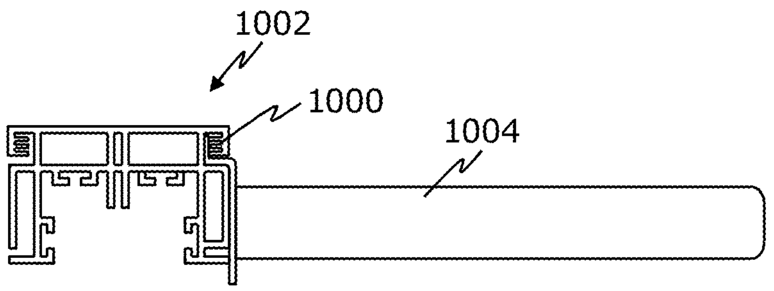
FIGS. 10A-F are schematic illustrations of a second profile of at least one extrusion member adapted to accommodate and clamp onto different implementations of a cooperating member of a slatwall bracket, respectively, in accordance with an embodiment of the present disclosure.
Figure 10B:
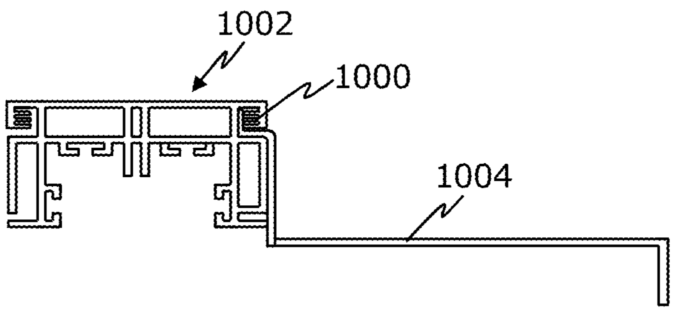
Figure 10C:
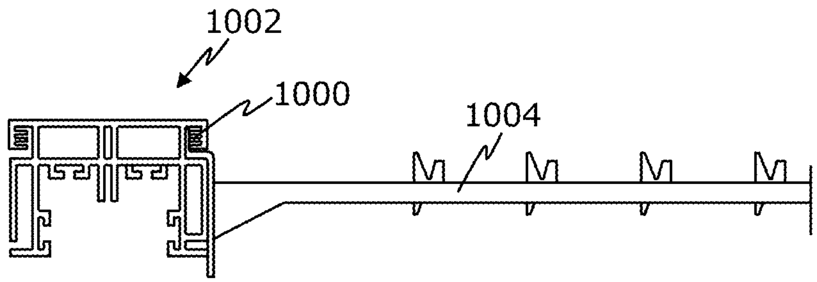
Figure 10D:
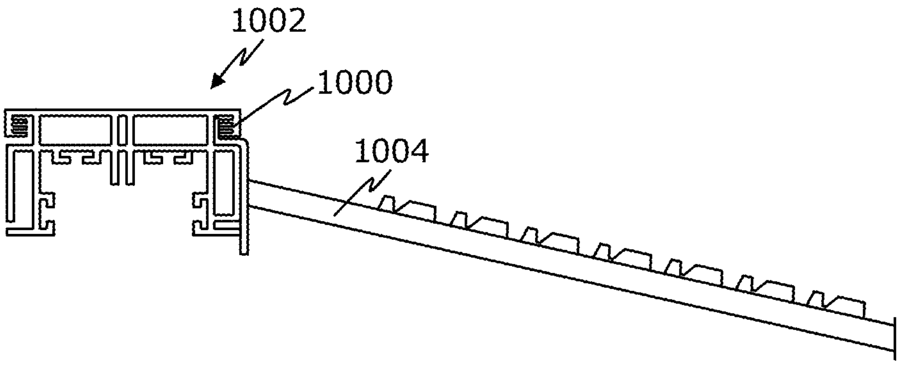
Figure 10E:
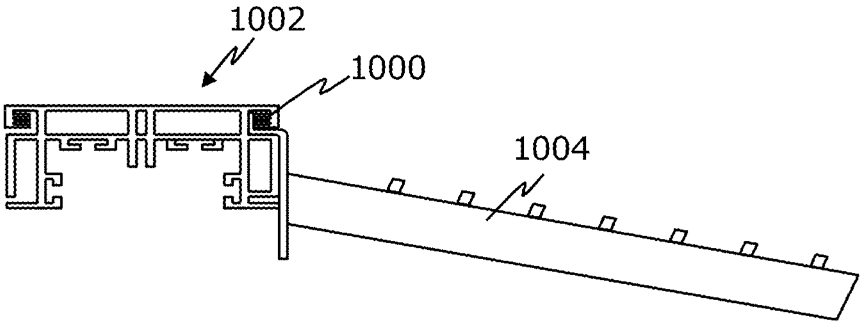
Figure 10F:
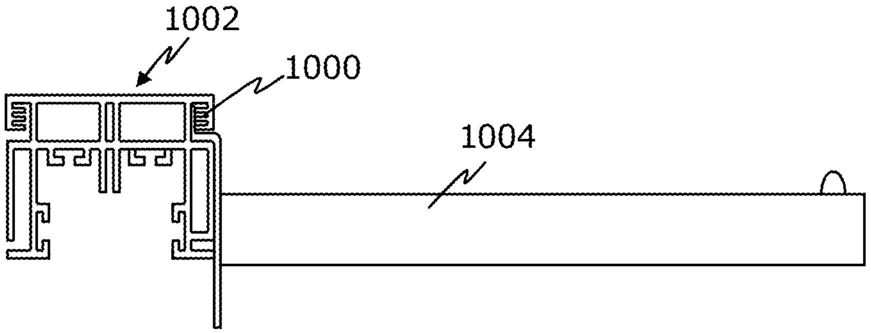

Referring to FIG. 9, illustrated is a schematic illustration of a perspective view of an implementation of a display frame assembly 900, in accordance with the embodiment of the present disclosure. As shown, a first profile (not shown) of a first extrusion member 902 in the display frame assembly 900 is adapted to accommodate and retain a silicon edge 904 of a corresponding SEG display fabric 906 to hold the corresponding SEG display fabric 906. Moreover, a support board 908 of the display frame assembly 900 is attached to second support board 910. Optionally, another first profile (not shown) of second extrusion member (depicted as a first another extrusion member 912) in the display frame assembly 900 is adapted to accommodate and retain another silicon edge 914 of the another corresponding SEG display fabric 916 to hold the another corresponding SEG display fabric 916.

Referring to FIGS. 10A-F, illustrated are schematic illustrations of a second profile 1000 of a first extrusion member 1002 adapted to accommodate and clamp onto different implementations of a cooperating member (not shown) of a slatwall bracket 1004, respectively, in accordance with an embodiment of the present disclosure.

Figure 11A:
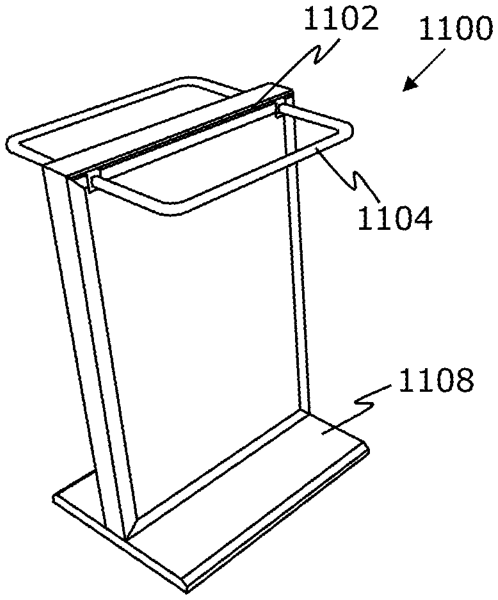
FIGS. 11A and 11B are schematic illustrations of different implementations of a display frame assembly, respectively, in accordance with an embodiment of the present disclosure.
Figure 11B:
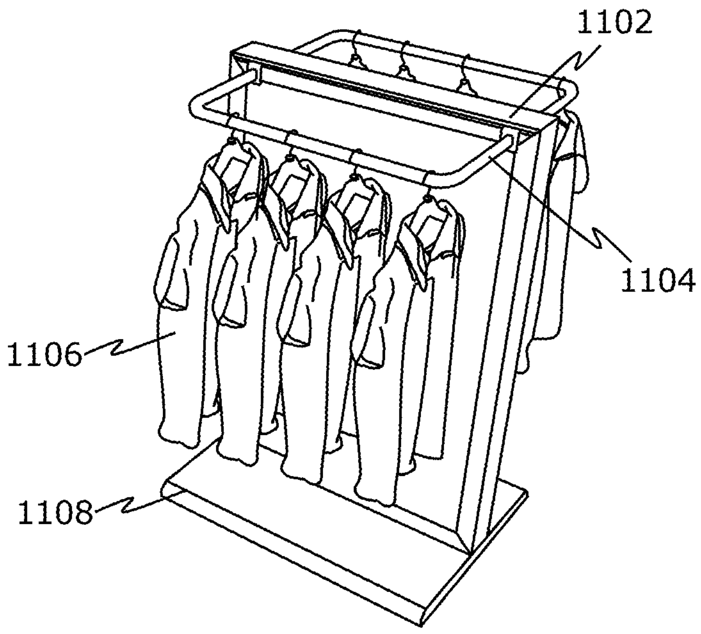

Referring to FIGS. 11A and 11B, illustrated are schematic illustrations of different implementations of a display frame assembly 1100, respectively, in accordance with an embodiment of the present disclosure. As shown, a second profile (not shown) of a first extrusion member 1102 in the display frame assembly 1100 is adapted to accommodate and clamp onto a cooperating member (not shown) of a slatwall bracket 1104 to display a plurality of products 1106. Moreover, the display frame assembly 1100 comprises a support structure 1108, wherein the support structure 1108 is a foot support.

Figure 12:
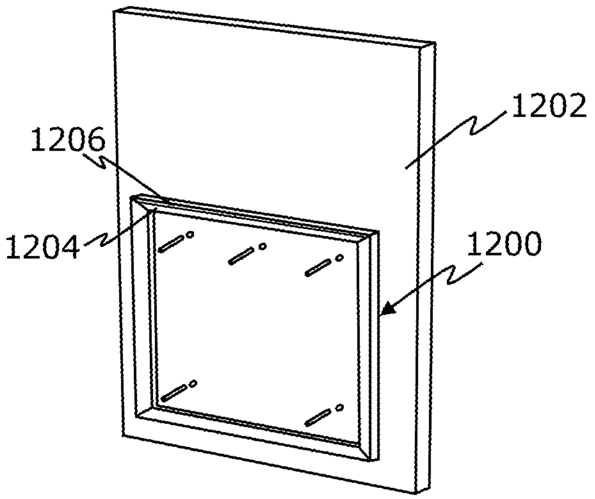
FIG. 12 is a schematic illustration of an exploded view of an implementation of a display frame assembly, in accordance with the embodiment of the present disclosure.

Referring to FIG. 12, illustrated is a schematic illustration of an implementation of a display frame assembly 1200, in accordance with the embodiment of the present disclosure. As shown, the display frame assembly 1200 comprises a support structure 1202, wherein the support structure 1202 is a wall support. Moreover, the display frame assembly 1200 comprises a first extrusion member 1204, wherein the first extrusion member 1204 comprises a second profile 1206 adapted to accommodate and clamp onto a cooperating member of a slatwall bracket (not shown) to display a plurality of products (not shown).

Figure 13:
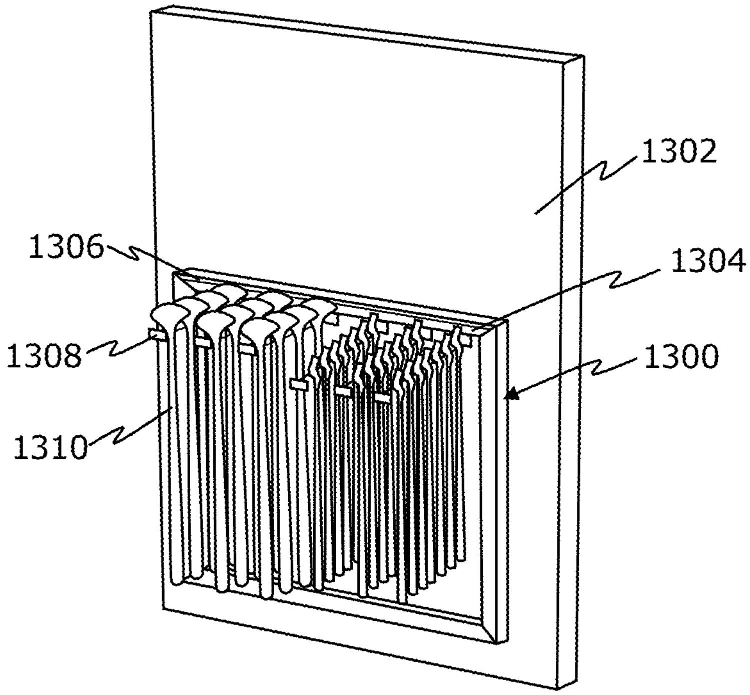
FIG. 13 is a schematic illustration of an implementation of a display frame assembly, in accordance with an embodiment of the present disclosure.

Referring to FIG. 13, illustrated is a schematic illustration of an implementation of a display frame assembly 1300, in accordance with an embodiment of the present disclosure. As shown, the display frame assembly 1300 comprises a support structure 1302, wherein the support structure 1302 is a wall support. Moreover, the extrusion member 1304 of the display frame assembly 1300 comprises a second profile 1306 adapted to accommodate and clamp onto a cooperating member (not shown) of a slatwall bracket 1308 to display a plurality of products 1310.

Figure 14:
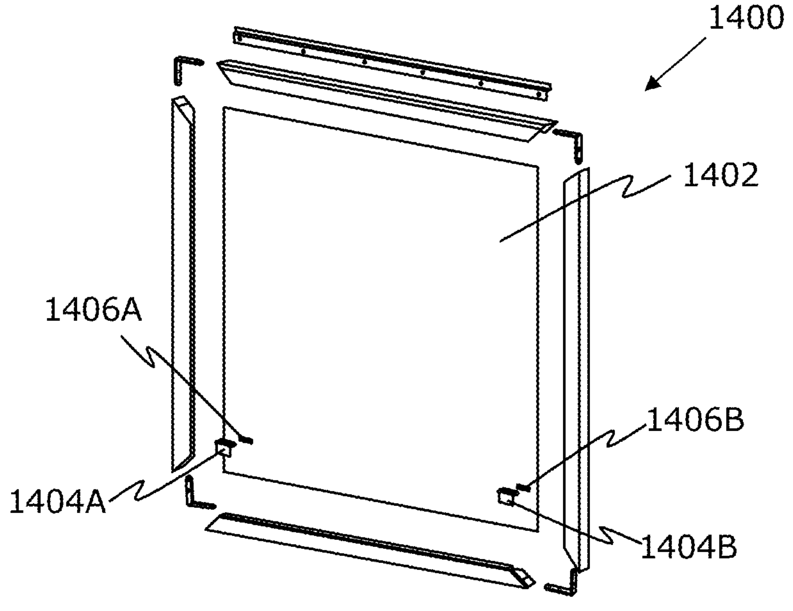
FIG. 14 is a schematic illustration of an exploded view of a display frame assembly, in accordance with an embodiment of the present disclosure.

Referring to FIG. 14, illustrated is a schematic illustration of an exploded view of a display frame assembly 1400, in accordance with an embodiment of the present disclosure. As shown, a support board 1402 comprises additional slatwall brackets 1404A-B inserted in spaces 1406A-B, respectively.

Figure 15:
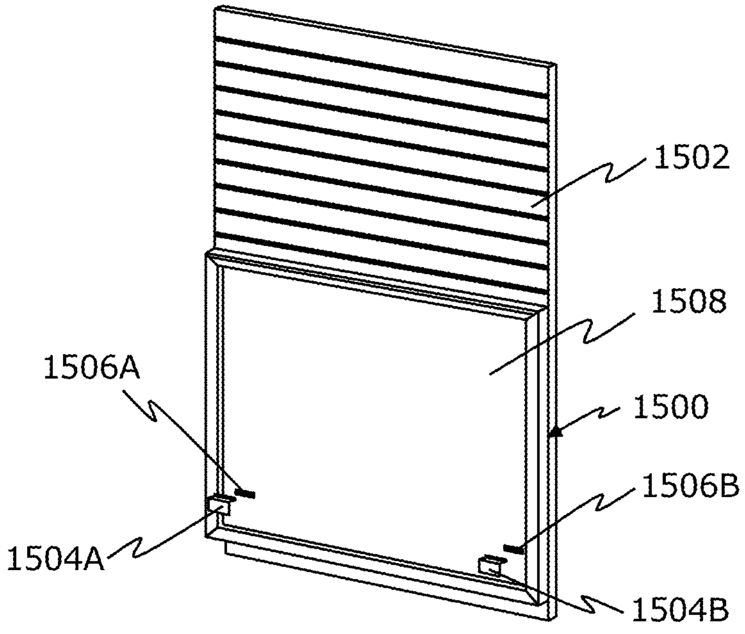
FIG. 15 is a schematic illustration of an implementation of a display frame assembly, in accordance with an embodiment of the present disclosure.

Referring to FIG. 15, illustrated is a schematic illustration of an implementation of a display frame assembly 1500, in accordance with an embodiment of the present disclosure. As shown, the display frame assembly 1500 comprises a support structure 1502, wherein the support structure 1502 is a wall support and wherein a support board 1508 is connected to the support structure 1502 using additional slatwall brackets 1500A-B inserted in spaces 1504A-B, respectively.

Figure 16:
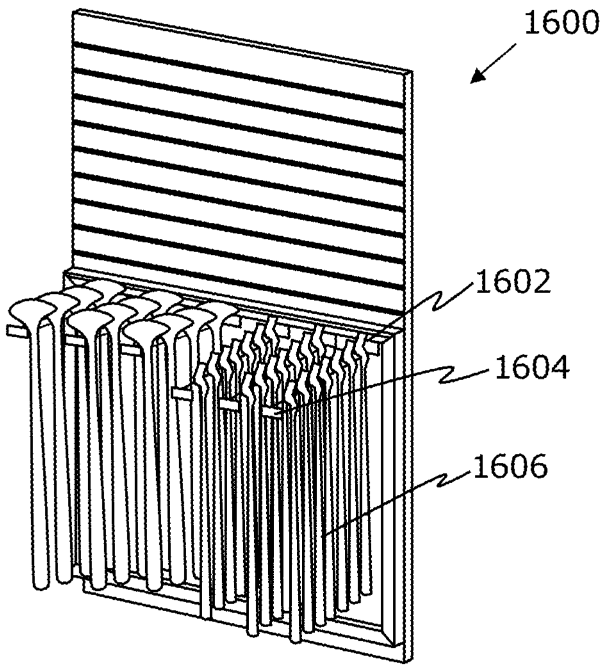
FIG. 16 is a schematic illustration of an implementation of a display frame assembly, in accordance with an embodiment of the present disclosure.

Referring to FIG. 16, illustrated is a schematic illustration of an implementation of a display frame assembly 1600, in accordance with an embodiment of the present disclosure. As shown, a first extrusion member 1602 the display frame assembly 1600 comprises a second profile (not shown) is adapted to accommodate and clamp onto a cooperating member (not shown) of a slatwall bracket 1604 to display a plurality of products 1606.

Figure 17A:
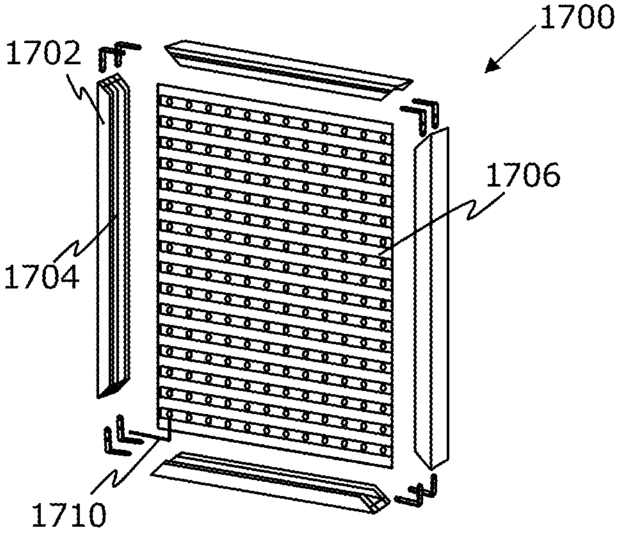
FIGS. 17A and 17B illustrated are schematic illustrations of an exploded view and a perspective view of a display frame assembly, respectively, in accordance with an embodiment of the present disclosure.
Figure 17B:
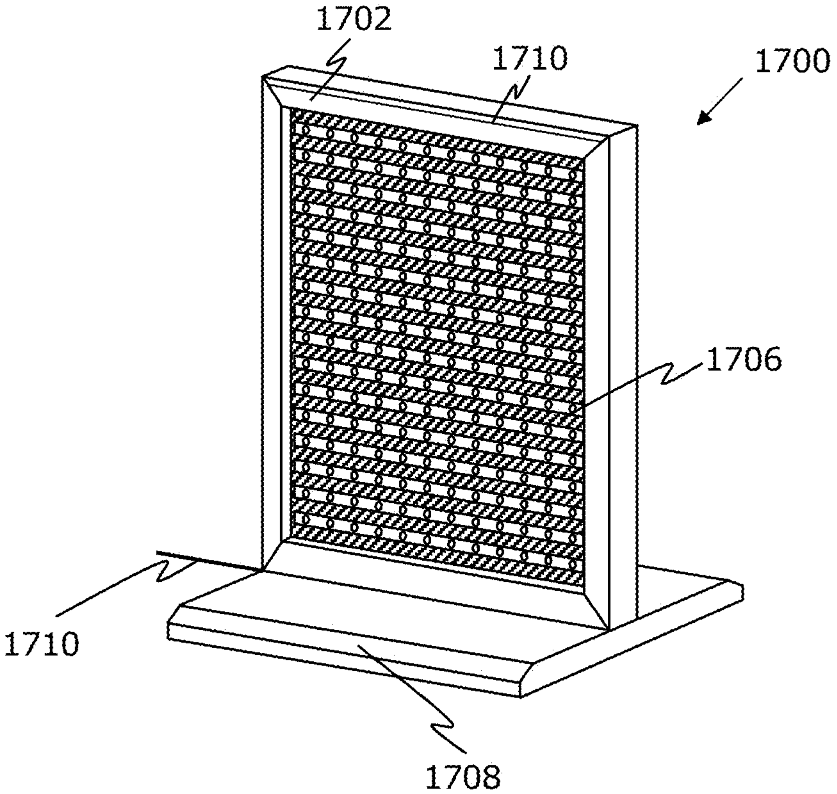

Referring to FIGS. 17A and 17B, illustrated are schematic illustrations of an exploded view and a perspective view of a display frame assembly 1700, respectively, in accordance with an embodiment of the present disclosure. As shown, each extrusion member in the display frame assembly 1700 comprise a channel 1704 arranged in a central part of each extrusion member 1702, wherein the channel 1704 is adapted to hold a board for supporting an array of LED components 1706 Electrical power is supplied to the LED array by an electrical power lead/cord 1706. Optionally, the display frame assembly 1700 comprises a support structure 1708, wherein the support structure 1708 is a foot support. Moreover, the first extrusion member 1702 comprises a second profile 1710 adapted to accommodate and clamp onto a cooperating member of a slatwall bracket (not shown) to display a plurality of products (not shown).

Figure 18:
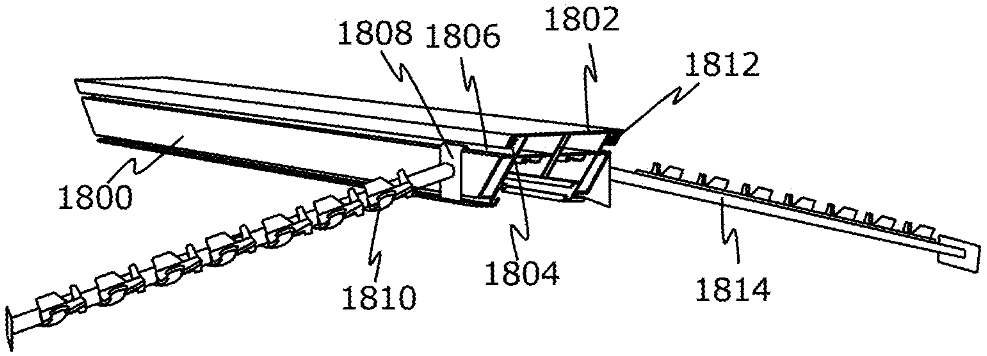
FIG. 18 is a schematic illustration of an implementation of an arrangement of a first extrusion member and a second extrusion member, respectively, in accordance with an embodiment of the present disclosure.

Referring to FIG. 18, illustrated is a schematic illustration of an implementation of an arrangement of a first extrusion component 1800 and a second extrusion component 1802, respectively, in accordance with an embodiment of the present disclosure. As shown, a second profile 1804 in the first extrusion component 1800 comprises a first slot 1806 configured to accommodate and retain a cooperating member 1808 of a first slatwall bracket 1810. Similarly, a second profile 1812 in the second extrusion member 1802 comprises a first slot (not shown) configured to accommodate and retain a cooperating member (not shown) of a second slatwall bracket 1814.

Figure 19:
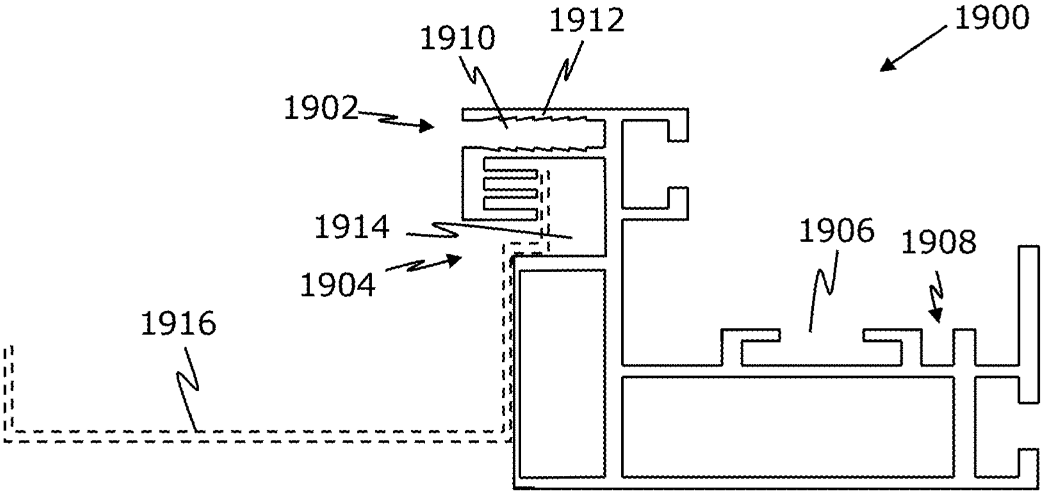
FIG. 19 is a schematic illustration of a cross-sectional view of at least one extrusion member, in accordance with an embodiment of the present disclosure.

Referring to FIG. 19, illustrated is a schematic illustration of a cross-sectional view of a first extrusion member 1900, in accordance with an embodiment of the present disclosure. As shown, the first extrusion member 1900 comprises a first profile 1902 adapted to accommodate and retain a silicon edge of a corresponding SEG display fabric to hold the corresponding SEG display fabric, and a second profile 1904 adapted to accommodate and clamp onto a cooperating member of a slatwall bracket 1906 to display a plurality of products. Optionally, the first extrusion member 1900 further comprises an internal channel 1906, which is adapted to accept an L-shaped supporting bracket corner bracket (not shown). Optionally, the first extrusion member 1900 further comprises a channel 1908 arranged in a central part of the first extrusion member 1900, wherein the channel is adapted to holding a support board comprising an array of LED components (not shown). Optionally, the first profile 1902 of the first extrusion member 1900 comprises a groove 1910 to accommodate and retain the silicon edge of the corresponding SEG display fabric. Optionally, the first profile 1902 further comprises a raised surface portion 1912 within the groove 1910 of the first profile 1902. Optionally, the second profile 1904 comprises a slot 1914 configured to accommodate and clamp onto the cooperating member of the slatwall bracket 1916. Optionally, the first profile 1902 is arranged to be at a higher position than the second profile 1904 in the first extrusion member 1900. The slat wall bracket 1916 is configured as a shelf which comprises a base component that extends from a first face of the extrusion member 1900.

Figure 20:
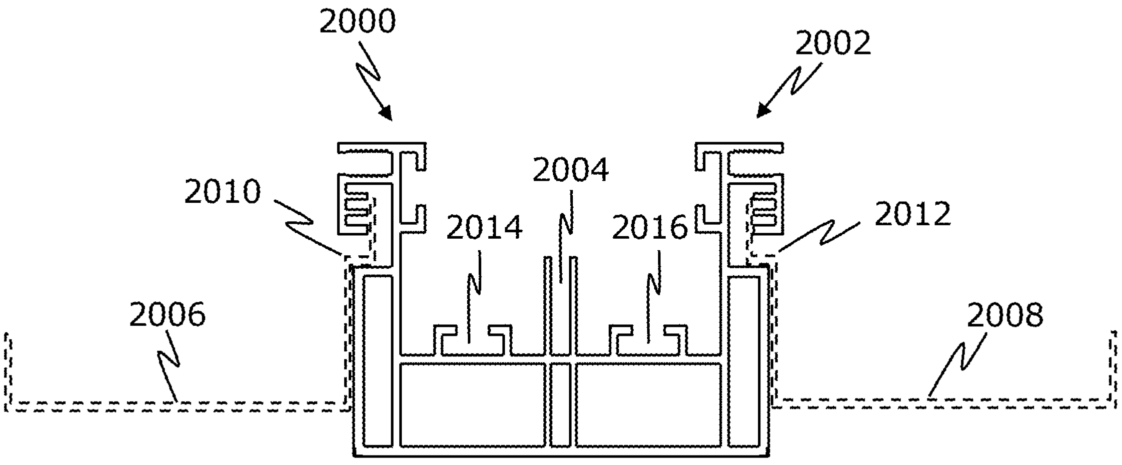
FIG. 20 is a schematic illustration of a cross-sectional view of an arrangement of a first extrusion member and a second extrusion member, respectively, in accordance with another embodiment of the present disclosure.

Referring to FIG. 20, illustrated is a schematic illustration of a cross-sectional view of an arrangement of a first extrusion component 2000 and a second extrusion component 2002, respectively, in accordance with another embodiment of the present disclosure. As shown, a central part 2014 of the first extrusion component 2000 is in contact with a central part 2016 of the second extrusion component 2002 to form a merged channel 2004 adapted to hold a support board comprising an array of LED's. Moreover, a second profile 2010 of the first extrusion component 2000 is adapted to accommodate and clamp onto the cooperating member of a slatwall bracket 2006. The slat wall bracket 2006 is configured as a first shelf which comprises a base component that extends from a first face of the first extrusion component 2000. Furthermore, a second profile 2012 of the second extrusion component 2002 is adapted to accommodate and clamp onto the cooperating member of a slatwall bracket 2008. The slat wall bracket 2008 is configured as a second shelf which comprises a base component that extends from a first face of the second extrusion component 2002.

Figure 21:
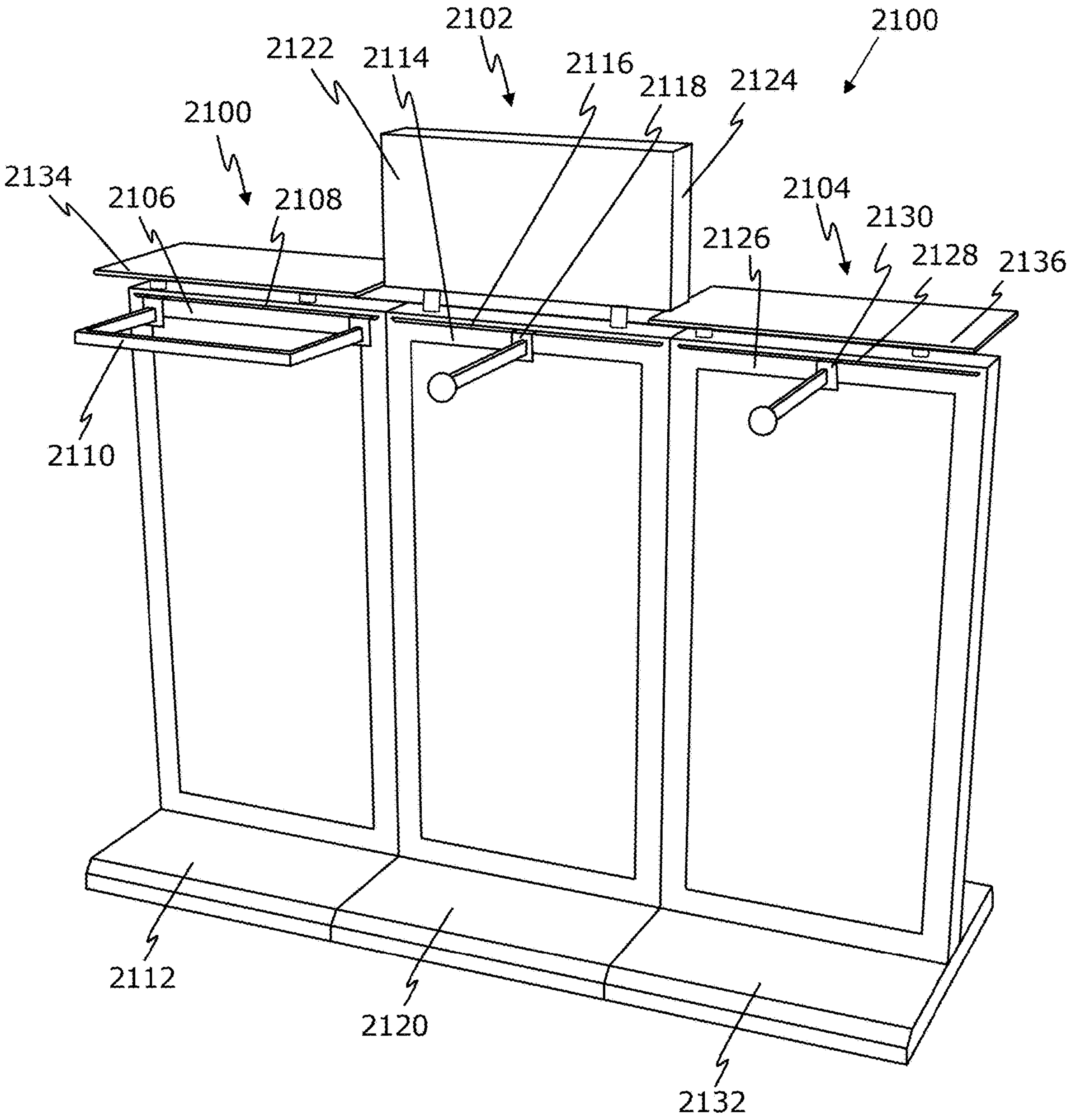
FIG. 21 is a schematic illustration of an arrangement of a first display frame assembly, a second display frame assembly, and a third display frame assembly, in accordance with an embodiment of the present disclosure.

Referring to FIG. 21, illustrated is a schematic illustration of an arrangement of a first display frame assembly 2100, a second display frame assembly 2102, and a third display frame assembly 2104, in accordance with an embodiment of the present disclosure. As shown, the first display frame assembly 2100 comprises a first extrusion member 2106, wherein the first extrusion member 2106 comprises a second profile 2108 adapted to accommodate a cooperating member of a slatwall bracket 2110. Moreover, the first display assembly 2100 further comprises a foot support structure 2112. Furthermore, a shelf structure 2134 is attached to the first extrusion member 2106. Similarly, the second display frame assembly 2102 comprises a first extrusion member 2114, wherein the at least one extrusion member 2114 comprises a second profile 2116 adapted to accommodate a cooperating member of a slatwall bracket 2118. Moreover, the second display assembly 2102 further comprises a foot support structure 2120. Furthermore, a display surface 2122 of the second display assembly 2102 is attached to another SEG display frame 2124. Similarly, the third display frame assembly 2104 comprises a first extrusion member 2126, wherein the first extrusion member 2126 comprises a second profile 2128 adapted to accommodate a cooperating member of a slatwall bracket 2130. Moreover, the third display assembly 2104 further comprises a foot support structure 2132. Furthermore, a shelf structure 2136 is attached to the first extrusion member 2126.

The invention claimed is:

1. A display frame assembly to hold a Silicon Edge Graphic (SEG) display fabric and a slatwall bracket, comprising:

- a plurality of extrusion members,
- wherein each extrusion member of the plurality of the extrusion members is attached to a neighboring extrusion member to form a display frame,
- wherein a first extrusion member provides a peripheral edge of a first face of the display frame;
- to hold the SEG display fabric and the slatwall bracket on the first face, and
- wherein the first extrusion member comprises:
  - a first profile comprising a groove adapted to accommodate and retain a silicon edge of a corresponding SEG display fabric; and a second profile comprising a slot adapted to accommodate and clamp onto a cooperating member of the slatwall bracket to display a plurality of products.

2. The display frame assembly of claim 1, wherein each extrusion member further comprises a channel arranged in a central part of each extrusion member, wherein the channel is adapted to retain a planar supporting member.

3. The display frame assembly of claim 2, wherein the planar supporting member comprises a first face pointing towards a first direction and a second face pointing towards a second direction opposite to the first direction, and wherein the first extrusion member comprises a first extrusion component arranged on a corresponding peripheral edge of the first face of the planar supporting member and a second extrusion component arranged on a corresponding peripheral edge of the second face, such that a central part of the first extrusion component is in contact with a central part of the second extrusion component.

4. The display frame assembly of claim 3, wherein the channel is adapted to hold a board for supporting an array of Light Emitting Diode components (LED's).

5. The display frame assembly of claim 1, wherein the first profile further comprises a raised surface portion within the groove of the first profile, wherein the raised surface portion is adapted to increase a hold of the groove over the silicon edge of the corresponding SEG display fabric.

6. The display frame assembly of claim 1, wherein at least one extrusion member is made using one of: aluminium, steel.

7. The display frame assembly of claim 1, wherein the corresponding SEG display fabric is made using one of: a high-resolution fabric, a polyester.

8. The display frame assembly of claim 1, wherein the groove in the first profile comprises a friction-fit mechanism to retain the silicon edge of the corresponding SEG display fabric.

9. The display frame assembly of claim 1, wherein at least one extrusion member further comprises an internal bracket, wherein the internal bracket is adapted to hold a first end of an L-shaped supporting plate, wherein a second end of the L-shaped supporting plate is held by an adjacent extrusion member attached to another peripheral edge adjacent to a corresponding peripheral edge.

10. The display frame assembly of claim 1, further comprising a support structure, wherein the support structure is one of: a foot support, a wall support.

11. The display frame assembly of claim 1, wherein the display frame is attached to a second SEG display frame to extend the display frame.

12. The display frame assembly of claim 1, wherein the groove in the first profile comprises a plurality of raised edges.

13. The display frame assembly of claim 12, wherein a depth of each raised edge amongst the plurality of raised edge is in a range of 0.5 mm to 2 mm.

14. The display frame assembly of claim 12, wherein a width of each raised edge amongst the plurality of raised edge is in a range of 0.1 mm to 0.5 mm.

15. A method for manufacturing a display frame assembly to hold a Silicon Edge Graphic (SEG) display fabric and a slatwall bracket, comprising:

assembling a plurality of extrusion members to form a display frame, wherein a first extrusion member provides a peripheral edge of a first face of the display frame;

adapting by the first extrusion member to hold the SEG display fabric and a slatwall bracket on the first face of the display frame, and wherein the first extrusion member comprises:

a first profile comprising a groove adapted to accommodate and retain a silicon edge of a corresponding SEG display fabric, and a second profile comprising a slot adapted to accommodate and clamp onto a cooperating member of a slatwall bracket to display a plurality of products.

* * * * *